(No Model.) 8 Sheets—Sheet 1.

C. F. ANNAN.
METHOD OF MAKING ENVELOPES AND MECHANISM THEREFOR.

No. 283,945. Patented Aug. 28, 1883.

Witnesses.
W. Rogers
A. L. White

Inventor.
C. F. Annan
by Wright & Brown
Attys.

(No Model.) 8 Sheets—Sheet 3.

C. F. ANNAN.
METHOD OF MAKING ENVELOPES AND MECHANISM THEREFOR.

No. 283,945. Patented Aug. 28, 1883.

(No Model.) 8 Sheets—Sheet 4.

C. F. ANNAN.
METHOD OF MAKING ENVELOPES AND MECHANISM THEREFOR.

No. 283,945. Patented Aug. 28, 1883.

Witnesses.
W. Rogers
A. L. White

Inventor.
C. F. Annan
by Knight Bros.
Attys.

(No Model.)   8 Sheets—Sheet 5.

C. F. ANNAN.
METHOD OF MAKING ENVELOPES AND MECHANISM THEREFOR.

No. 283,945. Patented Aug. 28, 1883.

Witnesses:
W. Rogers
A. L. White

Inventor:
C. F. Annan
by Wright & Brown
Attys.

(No Model.) 8 Sheets—Sheet 8.

C. F. ANNAN.
METHOD OF MAKING ENVELOPES AND MECHANISM THEREFOR.

No. 283,945. Patented Aug. 28, 1883.

Witnesses:
Walter Rogers
A. L. White

Inventor:
C. F. Annan
by Wright & Brown
Attys.

UNITED STATES PATENT OFFICE.

CHARLES F. ANNAN, OF BOSTON, MASSACHUSETTS.

METHOD OF MAKING ENVELOPES AND MECHANISM THEREFOR.

SPECIFICATION forming part of Letters Patent No. 283,945, dated August 28, 1883.

Application filed November 11, 1882. (No model.)

*To all whom it may concern:*

Be it known that I, CHARLES F. ANNAN, of Boston, in the county of Suffolk and State of Massachusetts, have invented certain Improvements in the Method of Making Envelopes and Mechanism Therefor, of which the following is a specification.

This invention has for its object to enable envelopes to be made from an endless web of paper by a continuous run through a single machine or a series of connected co-operating elements, and printed, if desired, while passing through said machine, the entire operation of producing the envelope being accomplished automatically and without the intervention of attendants during the entire operation.

The invention consists in the improved method of making envelopes and mechanism therefor, hereinafter described and claimed, for accomplishing the object stated.

Of the accompanying drawings, forming a part of this specification, Figs. 1, 1ª, 1ᵇ, 1ᶜ, and 1ᵈ, (Sheets 1, 2, 3, 4, and 7,) represent collectively a side elevation of a machine embodying my invention. Figs. 11, 12, 13, 14, 15, 16, 18, and 19 represent detail views.

The same letters of reference indicate the same parts in all the figures.

In carrying out my invention, I employ an organized machine involving devices for supporting a roll of paper of indefinite length, trimming the edges of the same, folding and gumming the trimmed edges, printing, (if desired,) severing transversely into blanks, folding transversely to form the receiving part of the envelope and leave a projecting transverse flap, gumming the latter, if the envelope is to be sealed, and drying, and finally folding the gummed flap. Said devices are supported in a suitable main frame-work, $a$, and a secondary frame-work, $a'$.

A represents the arbor on which the roll of paper to be made into envelopes is wound. Said arbor is journaled in one end of the frame $a$, and has adjustable conical collars $b\ b$ affixed to it by set-screws, said collars entering the central aperture in the roll of paper and supporting the weight of the latter, so that the roll can be adjusted laterally by moving the collars. The arbor A is journaled at one end in a sliding bearing, $c$, which is adjusted laterally by a screw, $d$, so as to move the shaft endwise and thus further adjust the roll of paper with reference to the succeeding parts of the machine.

$e$ represents a main driving-shaft, which imparts motion to the mechanism, hereinafter described, supported by the frame $a$ for feeding forward the paper web and performing the successive operations on the same.

B B represent feed rolls which draw the web from the roll A.

C C' C C' represent two pairs of rotating shears located on arbors $f\ f$, and adapted to trim the opposite edges of the web, as hereinafter described. The disks C' C' are positively secured to their arbor, but adjustable thereon, and the disks C C, which project slightly at their lower portions below the upper portions of the disks C' C', as shown in Fig. 11, are free to move lengthwise of their arbor, and are pressed against the disks C' C' by a spring, $g$.

Figures 1, 11, 12:
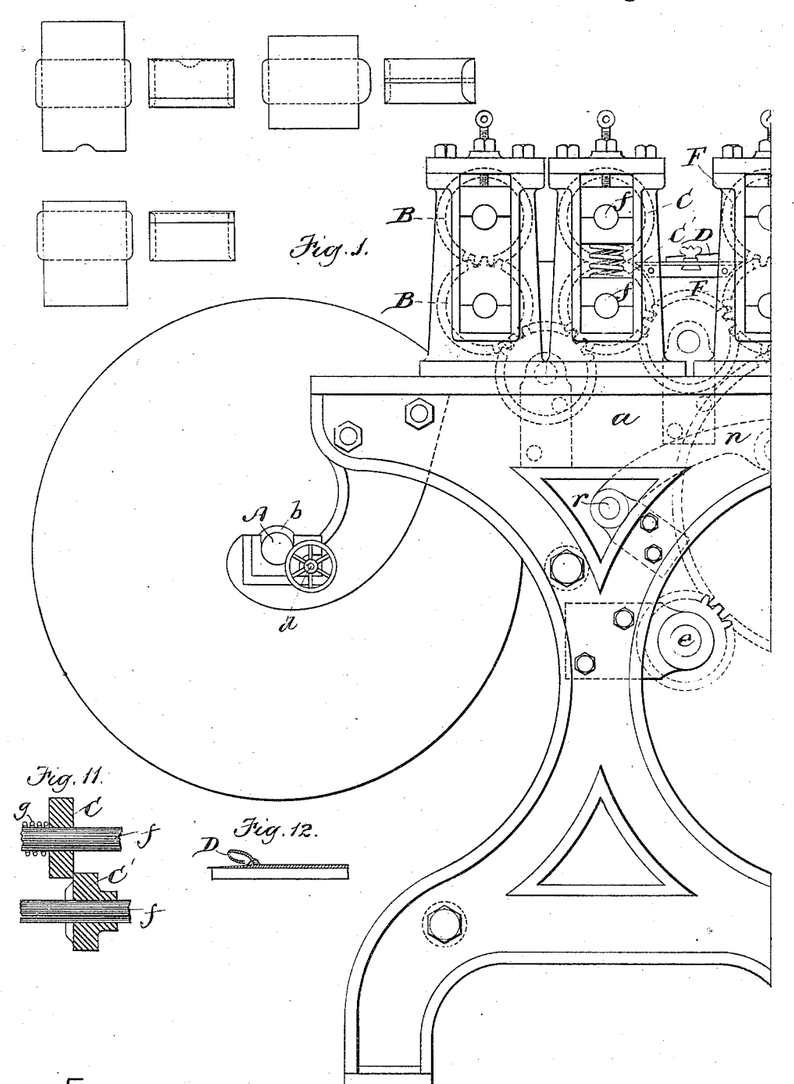
Figure 1A:
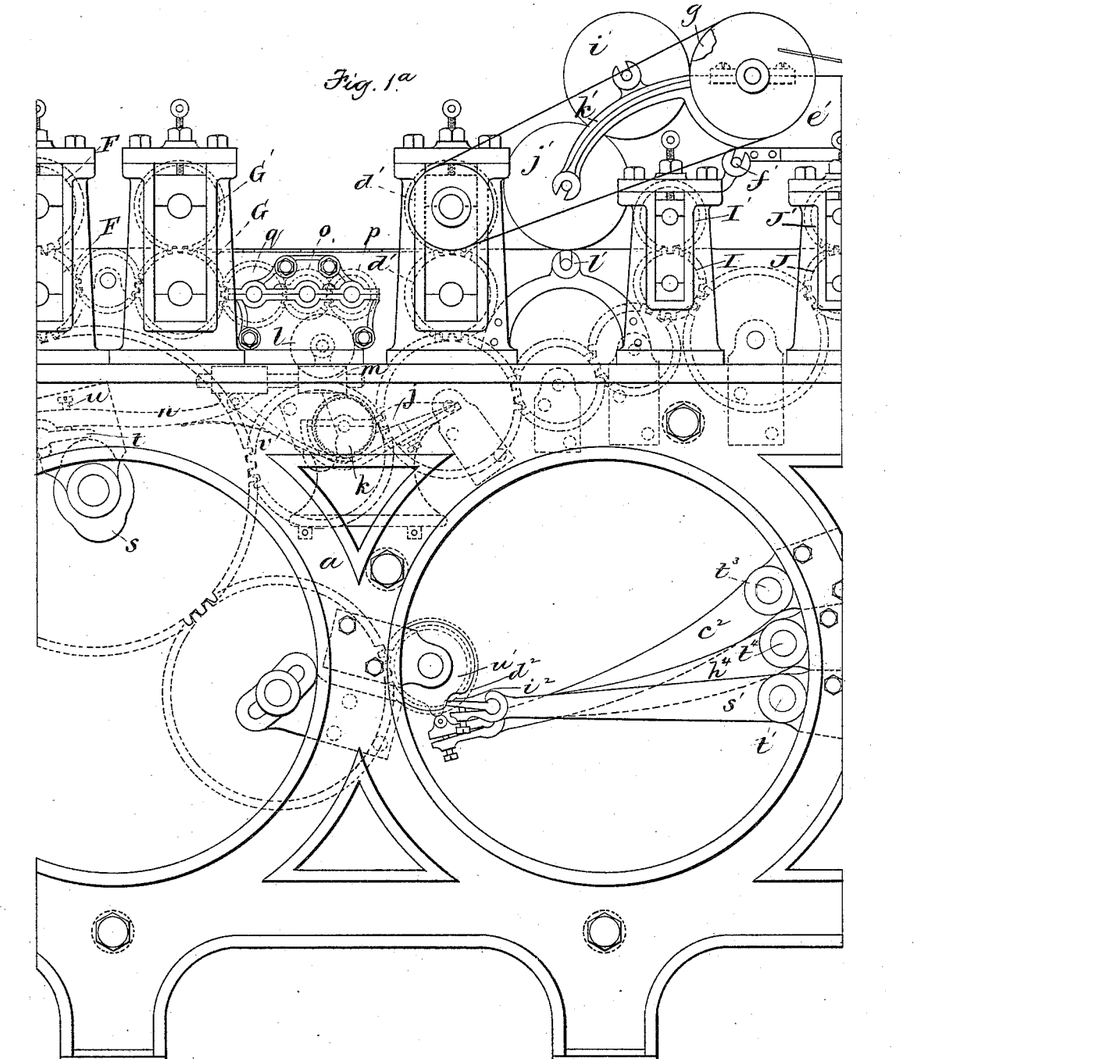
Figure 1C:
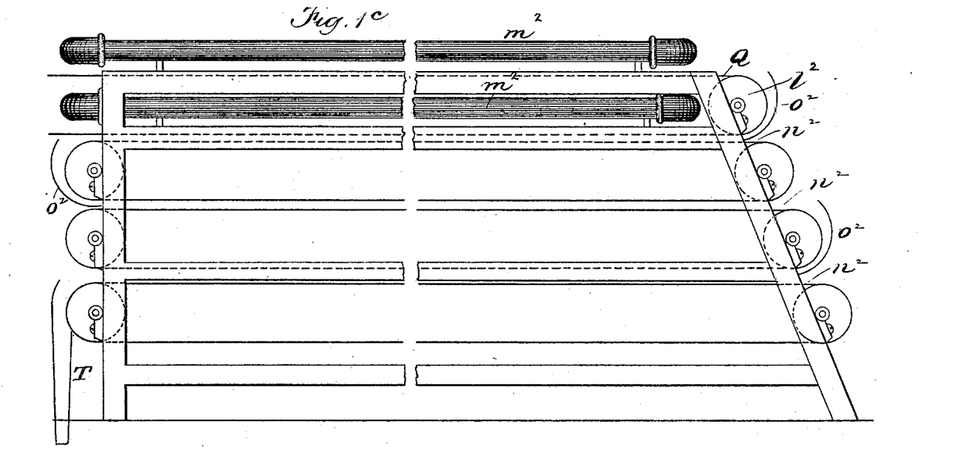
Figure 1D:
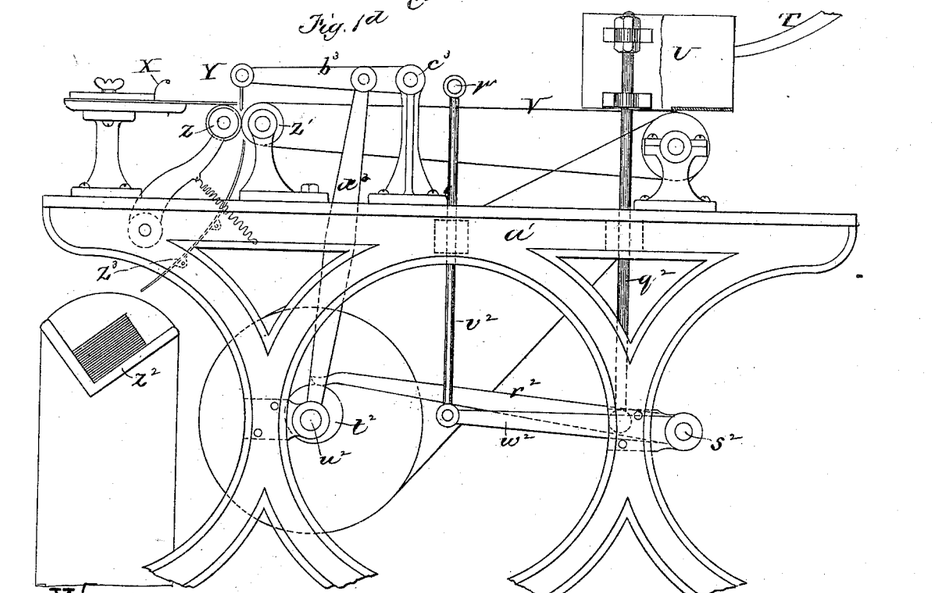

D D represent folders secured to the frame $a$, and capable of lateral adjustment to suit varying widths of paper, each folder being shaped in cross-section, as shown in Fig. 12, so as to turn inwardly one edge of the web.

Figure 13:
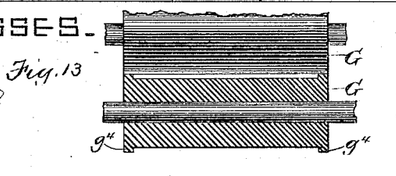

F F represent feed-rolls, which flatten and crease the parts turned in by the folders and feed the strip forward to the rollers G G'. The roller G is provided at its end with type-high flanges $g^4\ g^4$, (see Fig. 13,) which afford a bearing for the upper or bed roll, G', and permit electrotype or stereotype plates of equal height to be secured to the roll G between said flanges for the purpose of printing upon the under surface of the web as it passes between the rolls G G', said plates being attached to the roll G in any suitable manner.

Figure 2:
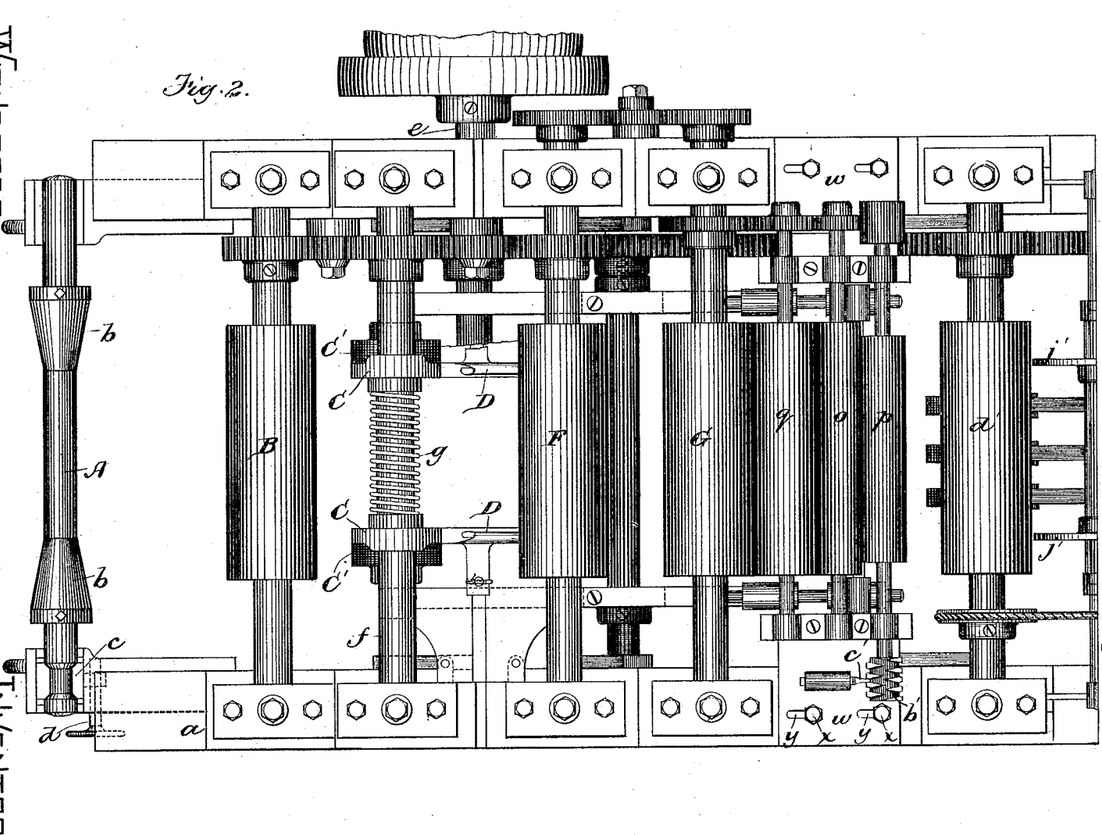
Figs. 2, 2ª, 2ᵇ, and 2ᶜ, (Sheets 5, 6, 4, and 7,) represent collectively a top view of the same.
Figure 2A:
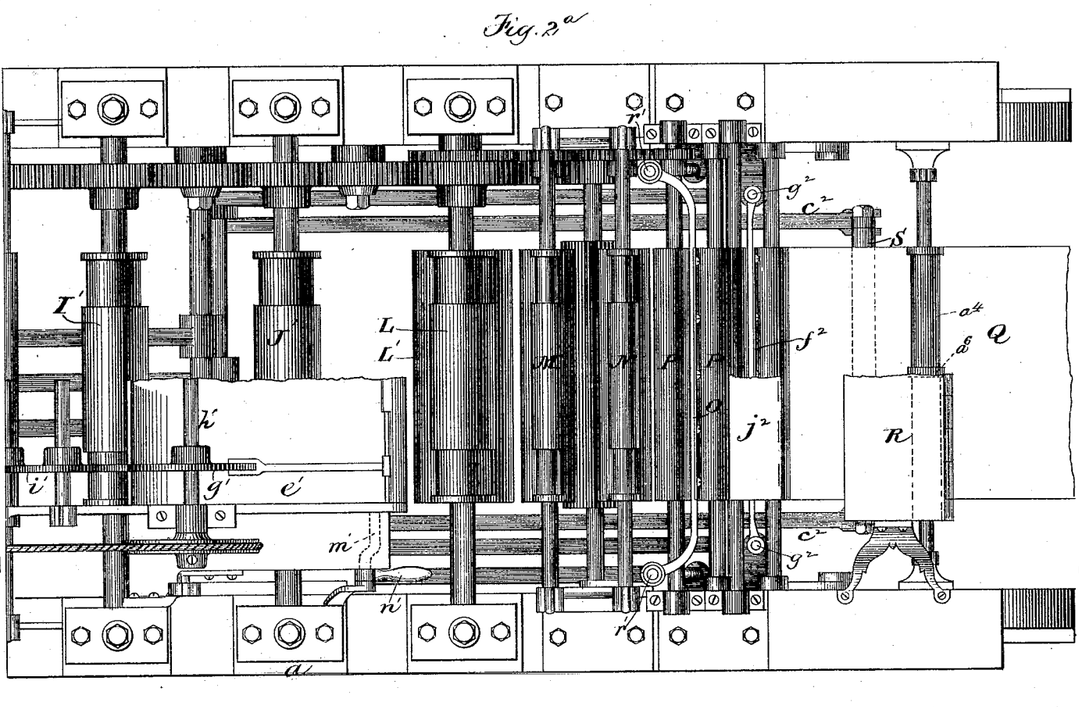
Figure 2B:
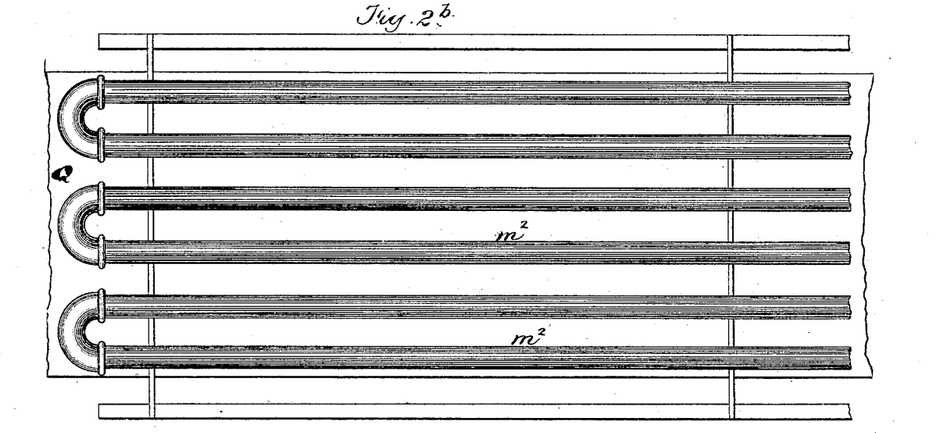
Figure 2C:
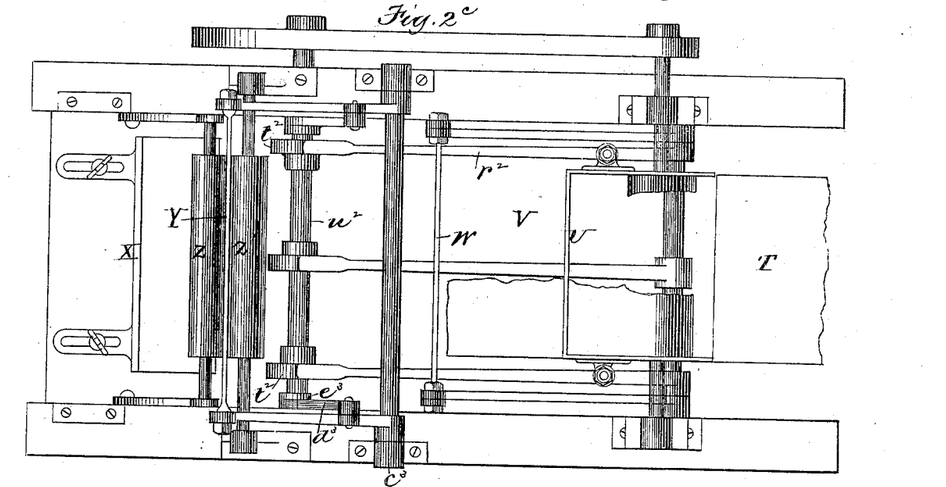

An inking mechanism is located behind the rolls G G', and consists of an ink-reservoir, $j$, an intermittently-rotated roll, $k$, journaled in the reservoir, an oscillating roll, $l$, which is pressed intermittently against the roll $k$ and is journaled in an adjustable sleeve, $m$, on an arm or lever, $n$, and distributing-rolls $o\ p\ q$, which receive ink from the oscillating roll $l$ and transfer it to the type on the roll G. The lever $n$ is pivoted at $r$ to the frame $a$, and is oscillated vertically by a rotary cam, $s$, so as to oscillate the roll $l$ from the feed-roll in the ink-reservoir to the distributing-roll $o$. The lever $n$ is provided with a toe or step, $t$, which is pivoted to the lever and arranged to bear upon the cam $s$. The toe $t$ is backed by a set-screw, $u$, which enables the toe to be adjusted and regulate the position of the roll $l$ at the upper and lower ends of its movement, so as to insure the proper contact of said roll with the rolls $k\ o$. The lever $n$ is provided with a dog, $v$, which engages with a ratchet attached to the arbor of the roll $k$, and gives said ratchet and roll a partial rotation at each upward movement of the lever $n$. The rolls $o\ p\ q$ are journaled in bearings supported by plates $w\ w$, which are secured to the frame $a$ by screws $x\ x$, passing through slots $y$ in said plates, said slots and screws making the plates $w$ and the rolls thereon adjustable, so that the roll $q$ can be caused to bear against the type on different-sized rolls G. The roll $p$ has an automatic endwise reciprocating movement imparted to it by means of a double worm, $b'$, on the end of its arbor and a fixed finger, $c'$, on one of the plates $w$, engaging with said worm, as shown in Fig. 2.

$d'\ d'$ represent a pair of feed-rolls, between which the web passes after leaving the rolls G G'. After the rolls $d'\ d'$ comes a gumming mechanism for gumming the opposite edges of the web on its upper surface. Said mechanism consists of a gum box or trough, $e'$, pivoted at $f'$ to the frame $a$, so as to be capable of tilting or rocking, two narrow gum-wheels, $g'$, rotating in said box and attached to an arbor, $h'$, which has a pulley belted to a pulley on the arbor of the roll $d$, and transferring gum-wheels $i'\ j'$ journaled in arms $k'$ attached to the gum-box. The wheels $i'$ are in rolling contact with the wheels $g'$, and the wheels $j'$ are in contact with the wheels $i'$ and the web, and deposit two narrow lines of gum on the edges thereof, as hereinafter described. A small loose roll, $l'$, supports the paper strip under the wheels $j'$. The wheels $g'$, $i'$, and $j'$ are preferably grooved in their peripheries to enable them to carry a sufficient quantity of gum. The rear portion of the gum-box is supported by a dog, $m'$, which is pivoted to the frame $a$, and forms a bearing for the bottom of the gum-box. The dog $m'$ is provided with a handle, $n'$, which enables it to be turned. When the dog is in the position shown in Fig. 1$^b$, it supports the gum-box in the position shown in said figure; but when the dog is turned on its pivot from said position it lowers the end of the gum-box resting upon it and causes the arm $k'$ and the forward end of the gum-box to tilt upwardly, thus raising the wheels $j'$ from the web and permitting said wheels to be removed from the arms $k'$. The operator is thus enabled to readily remove the gum-wheels $j'$ when the machine is not in operation, thus preventing said wheels from sticking to the web.

I I' J J' represent feed-rolls between which the web passes, after being gummed, to a pair of rolls, L L', the former having two longitudinal knives, $o'\ o'$, suitably secured in its periphery, and the latter, which is of composition, serves as a bed-roll for the knives $o'$.

M M N N represent two pairs of feed-rolls, which advance the blanks severed by the knives $o'$ and deposit said blanks upon a pair of horizontally-arranged rolls, P P.

O represents a folding-blade, which is supported by two vertically-movable rods, $r'$, and is reciprocated vertically by levers $s'$, pivoted at $t'$ to the frame $a$, and oscillated by a cam, $u'$, against which one of the levers $s'$ bears, said levers being rigidly connected together.

The rolls P P and folder O fold each blank, as hereinafter described.

Q represents a horizontal belt or apron under the rolls P P, and extending from thence beyond the rear of the frame $a$ to a drying apparatus.

R represents a gum-box, having in its lower portion a very narrow slit or opening extending crosswise of the frame $a$ and in close proximity to the upper surface of the apron Q. One side of said slit or mouth is composed of a flexible metal plate, $f^4$, which is pressed inwardly by cams $e^2$, and regulates the size of the opening, the plate having a tendency to spring outwardly against the cams $e^2$.

S represents a vertically-movable roll located below the upper portion of the apron, immediately under the mouth of the gum-box R, and supported by vertical rods $b^2$, and reciprocated vertically by levers $c^2$, pivoted at $t^3$ and oscillated by a cam, $d^2$.

$f^2$ represents an auxiliary folding-blade, located in the rear of the folding-blade O, and supported by vertical rods $g^2$, and reciprocated vertically by levers $h^4$, pivoted at $t^4$ and oscillated by a cam, $i^2$. The folder $f^2$, when depressed, presses the blanks between two rolls, $h^2\ h^2$, upon which the blanks are deposited when a certain kind of envelope is being made, as hereinafter described.

Figures 13, 14, 15, 16:
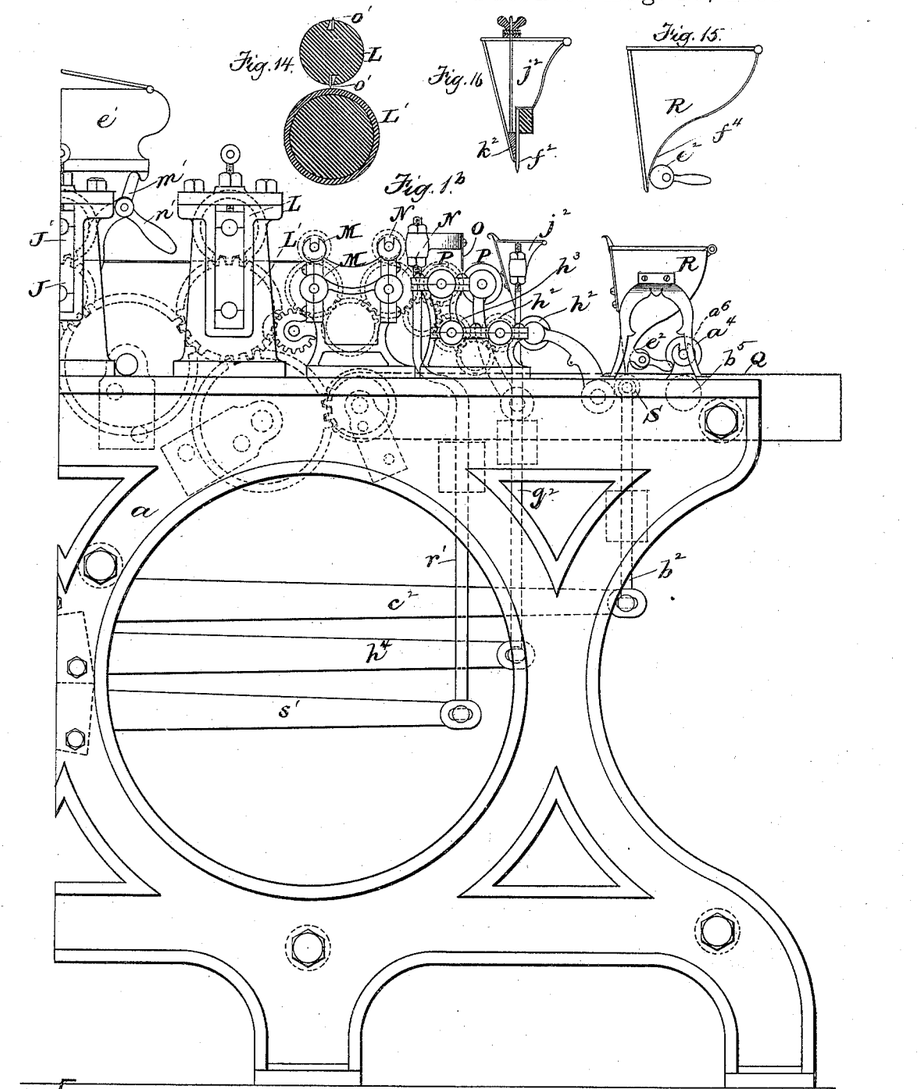

Above the folder $f^2$, and moving with it, is a gum-box, $j^2$, having a narrow gum-delivery aperture at its lower portion, one side of which aperture is the folder $f^2$. (See Fig. 16.) The gum therefore flows from the box upon one side of the folder. A vertically-adjustable wedge-shaped gate or valve, $k^2$, in the box $j^2$ regulates the quantity of gum that flows from the box.

The apron Q passes from the frame $a$ to a drier composed of a suitable frame supporting a roll, $l^2$, around which the apron Q passes, one or more aprons, $n^2$, supported on pulleys below the apron Q, each apron $n^2$ being arranged to receive envelope-blanks falling from the one above, and conduct said blanks in an opposite direction to the preceding apron, and steampipes $m^2$, or other means for heating the air around said aprons, said pipes being preferably arranged above and below the upper or carrying portion of each apron. Curved plates $o^2$ are provided at the receiving end of each apron to properly guide the envelope-blanks as they fall from the apron above. The pipes and aprons are preferably inclosed in sheet-metal casings $p^2$ to confine the heated air, said casings being made in removable sections to enable access to be conveniently had to any part of any belt or pipe. Said casings are omitted from Fig. 1$^c$ in order that the arrangement of the aprons $n^2$ may be clearly shown. The motion of the aprons through the casings creates a circulation of air which materially facilitates the drying operation. A chute or spout, T, leads from the lower apron in the series to the mechanism supported in the frame $a'$, said frame being preferably in a different apartment from the machine and drier, previously described. The chute is arranged to guide the envelope-blanks into a bottomless receptacle or box, U, which is located over an apron, V, the latter forming a moving bottom for said receptacle and supporting the envelope-blanks that accumulate therein. The receptacle U is supported by vertically-movable rods $q^2$, resting on levers $r^2$, which are attached to a rock-shaft, $s^2$, journaled in the frame $a'$, and bear at their opposite ends on cams $t^2$ on a driving-shaft, $u^2$, said cam, levers, and rods giving the receptacle U a slight vertical reciprocating movement equal to about the thickness of a single envelope.

W represents a gage arranged over the apron V at a slight distance from the receptacle U. Said gage is supported by vertically-movable rods $v^2$, which are in turn supported by arms $w^2$, attached to the rock-shaft $s^2$. The gage W is reciprocated vertically by the rock-shaft, arms, and rods, so that it alternately rests upon the surface of the apron V and rises above the same.

Y represents a vertically-reciprocating or oscillating folding-blade which is supported by arms $b^3$, pivoted at $c^3$ to fixed standards on the frame $a'$, and connected by rods $d^3$ with eccentrics $e^3$ on the shaft $u^2$, said eccentrics, rods, and arms imparting an up-and-down movement to the folder Y, and causing the latter to approach and recede from two rolls, Z' Z.

X represents an adjustable gage supported by a fixed standard on the frame $a'$.

Figure 3:
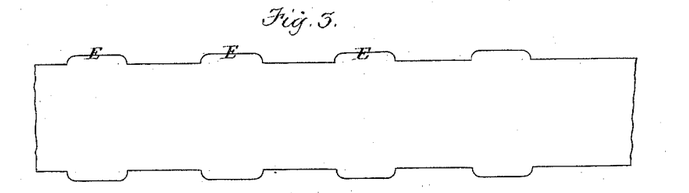
Figs. 3, 4, 5, 6, 7, 8, 9, 9ª, 9ᵇ, 9ᶜ, 9ᵈ, 10, and 17 represent views showing the stages of the operation of making envelopes.
Figure 4:
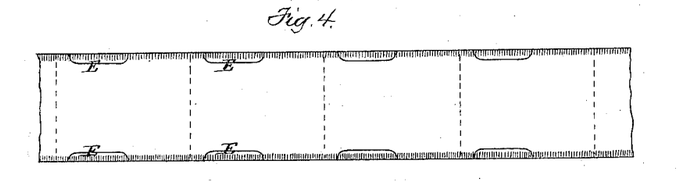

Operation: The roll of paper being in place on the arbor A, the outer end of the web is carried by the feed-rolls B B to the rotary shears C C', which trim the opposite edges of the web, cutting into the edges so as to form narrow flaps or offsets E, as shown in Fig. 3. The web next passes between the folders D D, which are arranged to turn the flaps inwardly toward the center of the strip. The rolls F F complete the folding of the flaps E by creasing the same and flattening them down against the surface of the web, as shown in Fig. 4.

Figure 5:
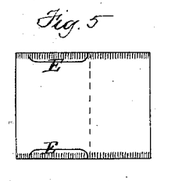
Figure 6:
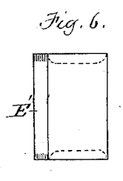
Figure 7:
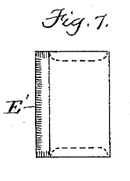

The web, with its folded flaps, next passes between the printing-roll G and its bed-roll G', and is printed on the space between the folded flaps E by an electrotype or stereotype plate affixed to the printing-roll, said plates being supplied with ink by the inking mechanism above described. The gum-rolls $j'$ $j'$, supplied with gum, as already described, deposit continuous lines of gum on the folded flaps and the intervening recessed edges of the web, as shown in Fig. 4, the shaded lines indicating the gum. The feed-rolls I I' J J' conduct the gummed web forward to the cut-off roll L and its bed-roll L', the upper feed-rolls, I' and J', being shorter than the corresponding lower ones, so that they will not touch the gummed portions of the web. The longitudinal knives of the cut-off roll sever the web transversely, as indicated by dotted lines in Fig. 4, into sections or blanks, each including one of the flaps E on each edge, as shown in Fig. 5. The feed-rolls M M N N take each severed blank and deposit it upon the horizontally-arranged rolls P P, between which the vertically-reciprocating folding-blade O works. The blade O, descending, imparts a fold to each blank on the dotted line shown in Fig. 5, and presents the blank in a semi-folded condition to the rolls P P, which grasp the blank, complete the fold, and press the gummed sides together, leaving the blank in the form shown in Fig. 6, one end projecting beyond the other and forming the final flap, E'. The blanks thus prepared drop upon the apron Q, and are carried thereby along toward the end of the machine and between the mouth of the gum-box R and the rising and falling roller or bumper S, the latter rising when the flap E' of each blank reaches it, and pressing said flap against the narrow mouth of the gum-box, thereby gumming said flap transversely, as shown by the shaded lines in Fig. 7. A narrow loose roll, $a^4$, resting on the belt Q, behind the gum-box R, prevents the blanks from sticking to the gum-box, said roll acting to press the blanks against the belt, and thus enable the latter to draw the blanks away from the gum-box. The roll $a^4$ has a central enlargement, $a^6$, which is the only part that touches the blanks. To prevent this part from being smeared with gum, I obstruct the mouth of the gum-box R at its center, so that the part of the blanks that pass under the central enlargement, $a^6$, of the roll $a^4$ are not gummed. A roll, $b^5$, journaled in the frame $a$, under the belt Q, supports the belt and the roll $a^4$. The blanks are then carried by the apron Q into the drying apparatus, where the gum on the flap E' is dried. After passing through the drying apparatus the blanks pass into the bottomless vertically-movable receptacle U, located over the carrying-apron V. The receptacle U is raised intermittently, by the mechanism described, sufficiently to permit the lower blank contained therein to be moved by its contact with the belt out from under the lower edge of the receptacle. The intermittently-operating gage W rests against the surface of the apron long enough to arrest each blank after it is removed from the receptacle and insure the proper position of the blank upon the apron and correct any displacement that may have taken place while the blank was being withdrawn from the receptacle. The gage W then rises and the apron carries the blank forward until its forward edge abuts against the gage X, leaving the flap E' under the folder Y. The latter then descends, creases the flap E', and presents the blank to the grasp of the rollers Z Z', which complete the folding of the flap E', thus completing the envelope and delivering it upon a curved plate, $Z^3$, which guides each envelope to a receiver, $Z^2$, where they accumulate, and from which they are removed by an attendant.

Figure 8:
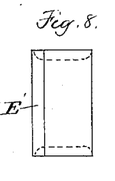

The result of the described operations is an envelope with a narrow gummed, dried, and folded flap extending lengthwise of the envelope, as shown in Fig. 8, and ready to be sealed by the user.

Figure 9:
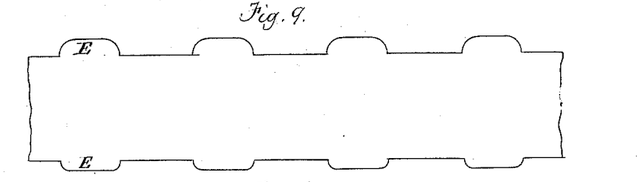
Figure 9A:
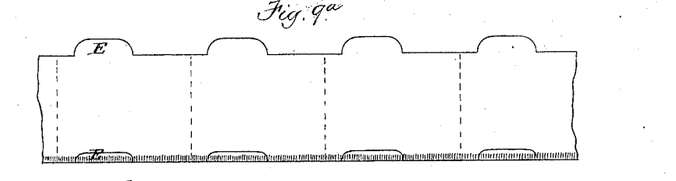
Figure 9B:
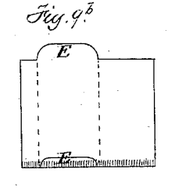
Figure 9C:
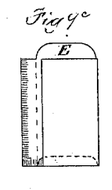
Figure 9D:
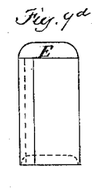
Figure 10:
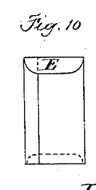

In case it is desirable to produce an envelope or bag having the unsecured flap ungummed and extending crosswise, as shown in Fig. 10, the flaps E on one edge of the strip are cut wider than those on the other edge, as shown in Fig. 9, and one of the folders D and gum-wheels $g'$ are removed, so that only one edge of the strip will be folded and gummed prior to the cutting operation, as shown in Fig. $9^a$. Each blank after being cut is therefore in the condition shown in Fig. $9^b$. The folder O and rolls P P next give it the shape or form shown in Fig. $9^c$. The blank, as it drops from the rolls P P, falls onto belts, which are placed for this operation on a roll, $h^3$, and the inner one of two rolls, $h^2$ $h^2$, previously referred to, and is carried by said belts onto the rolls $h^2$ $h^2$, under the folder $f^2$, which descends, gums the unfolded edge of the blank with the gum which flows from the box $j^2$, and folds the blank on the dotted line shown in Fig. $9^c$, leaving the blank in the form shown in Fig. $9^d$. The unfolded and ungummed flap may be left to be folded by the user, or may be folded by the folder Y and rolls Z Z', the blanks being properly placed in the receptacle U for this purpose. The receptacle U is made of sufficient size to receive any size of envelope or blank that the machine is capable of making, so that no change is required in the receptacle U when the machine is adapted for larger or smaller envelopes.

Figure 17:
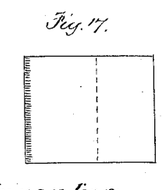
Figure 18:
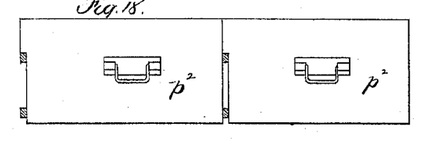
Figure 19:
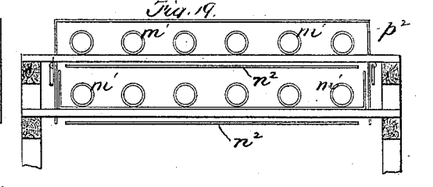

The machine may be operated without the edge-gumming wheels, edge-folders, and shears to produce rectangular sheets, as shown in Fig. 17, for newspaper and dry-goods wrappers, gummed at one edge only by the transverse gum-box R, and folded by the folder O and rolls P P on the dotted line shown in Fig. 17.

It will be observed that in making either form of envelope or wrapper described the articles are made by a continuous run of the paper through the machine, and from a single strip or roll, without the intervention of attendants. The envelopes or wrappers are printed before their completion, so that each impression is made on a single thickness of paper, and all risk of imperfect work and injury to type, resulting from varying thicknesses of paper under the type, is obviated.

I prefer to provide the shears, the printing-roll, and the cutting-off roll with duplicate operating parts, so that at each complete rotation of each of said rolls two envelope-blanks will be trimmed, printed, and cut off, thus making the operation of the machine more rapid than if a complete rotation of said parts were required for each blank. In making large-sized blanks, however, a complete rotation of each of said parts may be required for each blank. Power is communicated to the several parts above described from the main driving-shaft by suitable gearing and belting, which is clearly shown in the drawings.

I claim—

1. In an organized machine for making envelopes or equivalent articles, the combination of a support for a roll of paper, devices, substantially as described, for trimming the edges of a continuously-moving web, devices, substantially as described, for folding and gumming one or more edges of said web, cutting-off mechanism and devices, substantially as described, for gumming each blank transversely at one or more points, and devices, substantially as described, for folding each blank transversely at two points, all arranged and operated substantially as set forth.

2. In an organized machine for making envelopes or equivalent articles, the combination of a support for a roll of paper, devices, substantially as described, for trimming the edges of a continuously-moving web, devices, substantially as described, for folding and gumming the edges of said web, cutting-off mechanism, a device for folding each blank transversely, means for gumming one edge of each blank transversely after the initial folding, drying apparatus, and a device for giving a second fold to each blank after it passes through the drying apparatus, all constructed, arranged, and operated substantially as set forth.

3. The method herein described of making printed envelopes and equivalent folded articles, consisting in feeding a web of paper of indefinite length continuously forward, printing said web with inked type before it is folded and while said web is in motion, trimming its edges to form flaps, gumming and folding the same, severing it transversely into blanks, and gumming and folding said blanks transversely, as set forth.

4. The method herein described of making envelopes and equivalent articles, consisting in feeding a web of paper of indefinite length continuously forward and while said web is in motion, trimming its edges to form flaps, folding and gumming its edges, severing it transversely into blanks, and gumming and folding said blanks transversely, as set forth.

5. The combination, with the web-feeding, edge-folding, edge-gumming, cutting-off, and primary folding devices, of the carrying-apron Q, transverse gum-box R, and the reciprocating roll or bumper S, whereby the blanks are gummed transversely, as set forth.

6. The combination of the web-feeding, edge-folding, edge-gumming, cutting-off, and primary folding devices, the apron Q, the transverse gumming devices, and the drying apparatus, as set forth.

7. The combination, with the drier, of the chute T, the vertically-reciprocated receptacle U, the belt or apron V, constituting the bottom of said receptacle, and the secondary folding devices, as set forth.

8. The combination, with the vertically-reciprocated receptacle U, the belt V, and the secondary folding devices, of the intermittently-operating gage W, as set forth.

In testimony whereof I have signed my name to this specification, in the presence of two subscribing witnesses, this 9th day of November, 1882.

CHARLES F. ANNAN.

Witnesses:
C. F. BROWN,
A. L. WHITE.